(12) United States Patent
Zeng et al.

(10) Patent No.: US 8,346,977 B2
(45) Date of Patent: Jan. 1, 2013

(54) DEVICE ADDRESS ASSIGNMENT IN A BUS CASCADE SYSTEM

(75) Inventors: Xiaojun Zeng, Shanghai (CN); Kaiya Sheng, Shanghai (CN)

(73) Assignee: O2Micro International Limited, Grand Cayman (KY)

( * ) Notice: Subject to any disclaimer, the term of this patent is extended or adjusted under 35 U.S.C. 154(b) by 0 days.

(21) Appl. No.: 12/854,041

(22) Filed: Aug. 10, 2010

(65) Prior Publication Data

US 2011/0289239 A1 Nov. 24, 2011

(30) Foreign Application Priority Data

May 20, 2010 (CN) .............................. 201010179342

(51) Int. Cl.
*G06F 3/00* (2006.01)
*G06F 13/00* (2006.01)
(52) U.S. Cl. ............... 710/4; 710/33; 710/110; 710/305
(58) Field of Classification Search .................. 710/3–9, 710/33, 110, 305; 370/431–438
See application file for complete search history.

(56) References Cited

U.S. PATENT DOCUMENTS

| | | | |
|---|---|---|---|
| 4,580,261 A * | 4/1986 | Pelotte | 370/438 |
| 4,716,354 A | 12/1987 | Hacker | |
| 4,723,241 A | 2/1988 | Grobel et al. | |
| 4,773,005 A * | 9/1988 | Sullivan | 710/9 |
| 4,962,378 A * | 10/1990 | Fadem | 370/447 |
| 5,423,050 A | 6/1995 | Taylor et al. | |
| 5,504,413 A | 4/1996 | Fernandez et al. | |
| 5,701,068 A | 12/1997 | Baer et al. | |
| 5,841,996 A | 11/1998 | Nolan et al. | |

(Continued)

FOREIGN PATENT DOCUMENTS

CN 1319189 A 10/2001

(Continued)

OTHER PUBLICATIONS

Office Action mailed Jan. 13, 2011 from related U.S. Appl. No. 12/872,432.

(Continued)

*Primary Examiner* — Christiopher B Shin
(74) *Attorney, Agent, or Firm* — SNR Denton US LLP

(57) ABSTRACT

According to one aspect there is disclosed an apparatus. The apparatus may include a first device. The first device may include a first serial input port configured to receive serial data from at least one of a host MCU and a second device; a first serial output port configured to output the serial data to a third device when the third device is coupled to the first device; a first shift register configured to receive the serial data from the first serial input port; a first multiplexer configured to selectively couple the first serial output port to the first shift register or the first serial input port; and a bus controller configured to receive the serial data from the first serial input port, the bus controller further configured to control the first multiplexer to couple the first serial output port to the first serial input port or the first shift register, based at least in part on the serial data, wherein the serial data includes a command section of a command and at least a portion of a payload section of the command, wherein the command section includes a command code, a target address and an error check and the payload section includes at least one new address and at least one corresponding error check.

20 Claims, 5 Drawing Sheets

U.S. PATENT DOCUMENTS

| | | | |
|---|---|---|---|
| 5,850,351 A | 12/1998 | Lotfy et al. | |
| 5,974,475 A * | 10/1999 | Day et al. | 710/9 |
| 6,031,354 A | 2/2000 | Wiley et al. | |
| 6,094,053 A | 7/2000 | Harvey | |
| 6,172,479 B1 | 1/2001 | Barton | |
| 6,281,684 B1 | 8/2001 | James | |
| 6,404,166 B1 | 6/2002 | Puchianu | |
| 6,462,510 B1 | 10/2002 | Takada et al. | |
| 6,611,774 B1 | 8/2003 | Zaccaria | |
| 6,762,588 B2 | 7/2004 | Miyazaki | |
| 7,020,076 B1 | 3/2006 | Alkalai et al. | |
| 7,023,845 B1 | 4/2006 | Simons et al. | |
| 7,034,540 B2 | 4/2006 | Anzawa et al. | |
| 7,466,104 B2 | 12/2008 | Wang et al. | |
| 7,489,030 B2 | 2/2009 | Shibata et al. | |
| 7,511,457 B2 | 3/2009 | Emori et al. | |
| 7,615,966 B2 | 11/2009 | Houldsworth et al. | |
| 8,015,452 B2 | 9/2011 | Li | |
| 8,022,669 B2 | 9/2011 | Li | |
| 2001/0037482 A1 * | 11/2001 | Plants | 714/763 |
| 2004/0019441 A1 | 1/2004 | Larson | |
| 2004/0164706 A1 | 8/2004 | Osborne | |
| 2004/0225810 A1 * | 11/2004 | Hiratsuka | 710/305 |
| 2005/0275389 A1 | 12/2005 | Cordoba | |
| 2006/0072262 A1 | 4/2006 | Paik et al. | |
| 2006/0136609 A1 * | 6/2006 | Vladimir | 710/8 |
| 2006/0259280 A1 | 11/2006 | Zaccaria | |
| 2007/0182377 A1 | 8/2007 | Vandensande | |
| 2008/0088277 A1 | 4/2008 | Wang et al. | |
| 2009/0144471 A1 * | 6/2009 | Lin | 710/110 |
| 2010/0173180 A1 | 7/2010 | Li | |
| 2010/0259221 A1 | 10/2010 | Tabatowski-Bush | |
| 2011/0012638 A1 * | 1/2011 | Shuler, Jr. | 326/11 |
| 2011/0140533 A1 | 6/2011 | Zeng | |
| 2011/0309799 A1 | 12/2011 | Firehammer | |
| 2011/0313613 A1 | 12/2011 | Kawahara et al. | |

FOREIGN PATENT DOCUMENTS

| | | |
|---|---|---|
| JP | 2001-307782 A | 11/2001 |
| JP | 2003-111297 A | 4/2003 |
| JP | 2005-033951 A | 2/2005 |
| JP | 2007-158237 A | 6/2007 |
| JP | 2007-252175 A | 9/2007 |
| JP | 2009-027916 A | 2/2009 |
| WO | 9527358 A1 | 10/1995 |
| WO | 0005596 A1 | 2/2000 |
| WO | 2006068429 A1 | 6/2006 |

OTHER PUBLICATIONS

Notice of Allowance mailed Apr. 14, 2011 from related U.S. Appl. No. 12/872,432.

EP search report in Europe Application No. 10150165.8 dated Oct. 18, 2010.

Notice of Allowance dated May 19, 2011 received in related U.S. Appl. No. 12/872,432.

Office Action dated Feb. 2, 2012 received in related U.S. Appl. No. 13/154,736.

European Search Report dated Jan. 16, 2012 issued in related European Patent Application No. 11175176.

\* cited by examiner

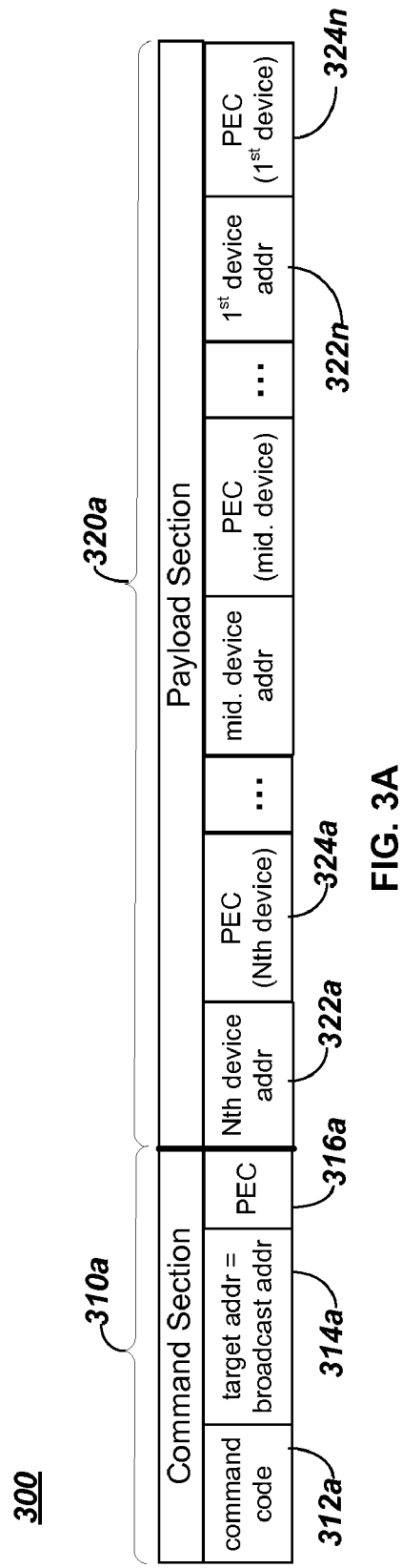
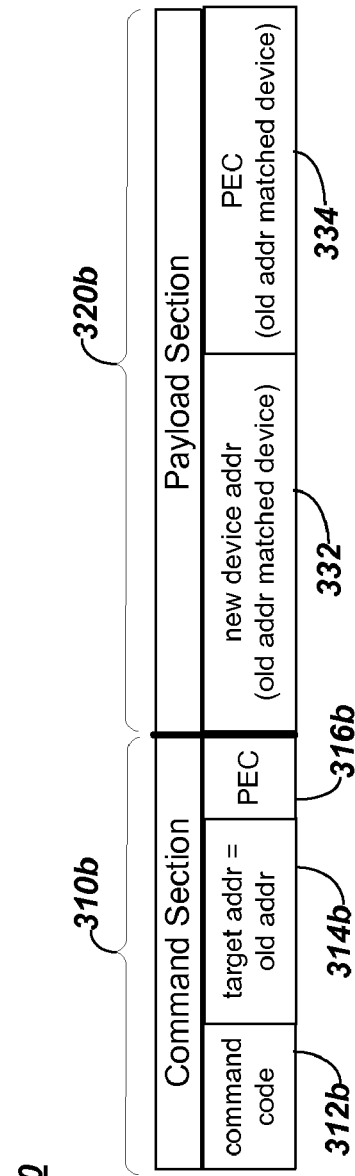
FIG. 3A
FIG. 3B

DEVICE ADDRESS ASSIGNMENT IN A BUS CASCADE SYSTEM

BACKGROUND

A plurality of devices may be coupled together. In order to individually access each of the plurality of devices, each device should have a unique identifier, i.e., address. It may be desirable for each device to be manufactured identically to each other device, providing savings in both manufacturing cost and the time to manufacture the devices. In operation, however, it may be desirable to individually address each device, e.g., in order to access a particular device. It may also be desirable to assemble the plurality of devices into a system without consideration of a relative position of each device in the system. Providing unique addresses at manufacturing can be done but adds time and cost to the manufacturing process. It may therefore be desirable to identify and assign unique addresses to the devices after they have been assembled into the system.

SUMMARY

According to one aspect there is disclosed an apparatus. The apparatus may include a first device. The first device may include a first serial input port configured to receive serial data from at least one of a host MCU and a second device; a first serial output port configured to output the serial data to a third device when the third device is coupled to the first device; a first shift register configured to receive the serial data from the first serial input port; a first multiplexer configured to selectively couple the first serial output port to the first shift register or the first serial input port; and a bus controller configured to receive the serial data from the first serial input port, the bus controller further configured to control the first multiplexer to couple the first serial output port to the first serial input port or the first shift register, based at least in part on the serial data, wherein the serial data includes a command section of a command and at least a portion of a payload section of the command, wherein the command section includes a command code, a target address and an error check and the payload section includes at least one new address and at least one corresponding error check.

According to another aspect there is disclosed a method for assigning addresses to at least one device. The method may include receiving serial data at a first device, wherein the serial data includes a command section of a command and at least a portion of a payload section of the command, wherein the command section includes a command code, a target address and a command error check and the payload section includes at least one new address and at least one corresponding error check; determining whether the serial data is targeted for the first device based, at least in part, on the command section; storing a first address in the first device if the serial data is targeted for the first device; and outputting the first address to a second device or latching the first address in the first device based, at least in part, on the command section.

In yet another aspect there is disclosed a system. The system may include a plurality of devices; and a host controller coupled to a first device of the plurality of devices, the host controller is configured to provide serial data to the first device wherein the serial data includes a command section of a command and at least a portion of a payload section of the command, the command section includes a command code, a target address and an error check and the payload section includes at least one new address and at least one corresponding error check, wherein the command code is configured to cause at least one device to store or output a respective new address. Each device may include a first serial input port configured to receive the serial data, a first serial output port configured to output the serial data to another device, a first shift register configured to receive the serial data from the first serial input port, a first multiplexer configured to selectively couple the first serial output port to the first shift register or the first serial input port, and a bus controller configured to receive the serial data from the first serial input port, the bus controller further configured to control the first multiplexer to couple the first serial output port to the first serial input port or the first shift, based at least in part on the serial data.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 3A depicts a data structure corresponding to command(s) to assign addresses to a plurality of devices in a system, consistent with the present disclosure;

FIG. 3B depicts a data structure corresponding to command(s) to change the address of a single device in the system, consistent with the present disclosure.

DETAILED DESCRIPTION

A system, apparatus and/or method consistent with the present disclosure are configured to assign addresses to a plurality of devices coupled together in a system. The plurality of devices include at least one serial input port and at least one serial output port. The devices are configured to receive serial data from another device and/or a host controller and to provide serial data to another device and/or host controller via the serial ports. The address(es) may be assigned serially, as described herein. For example, the system may be a battery management system.

Figure 1:
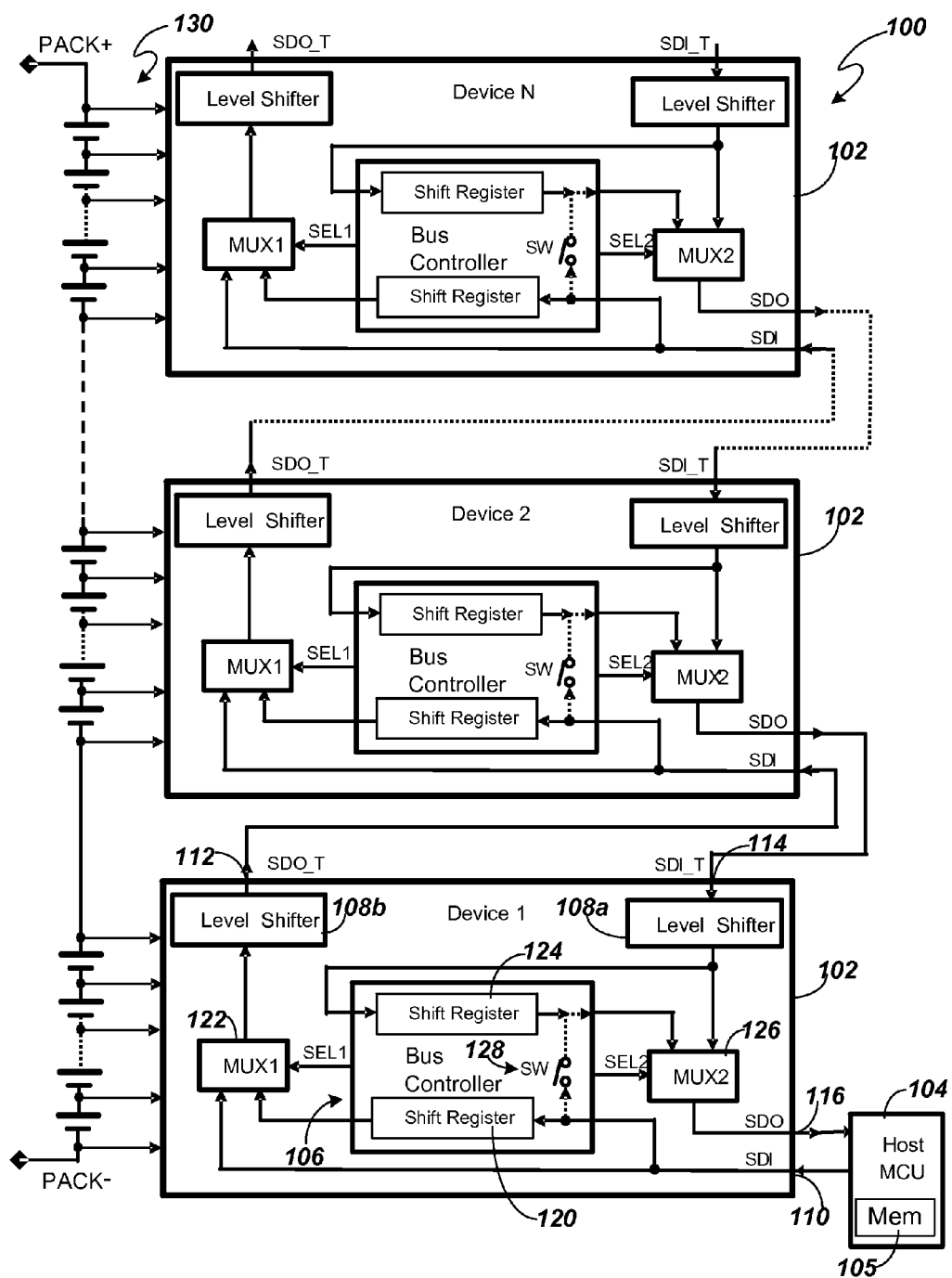
FIG. 1 depicts a block diagram of one embodiment of vertical bus system circuitry consistent with the present disclosure.

FIG. 1 depicts a block diagram of one embodiment of vertical bus system circuitry 100 consistent with the present disclosure. The embodiment of system circuitry 100 is configured as a vertical bus with non-common ground as described herein. The vertical bus system 100 may each include a plurality of devices 102. Each device 102 includes device circuitry. For example, the vertical bus system 100 may include a plurality of devices: Device 1, Device 2, . . . , Device N. For ease of description, a specific device will be referred herein to as "Device x" where x is 1, 2, . . . , N, and an individual device that may be any of the plurality of devices will be referred to herein as "device 102".

Each device 102 may include a first serial input port 110, a first serial output port 112, a second serial input port 114 and a second serial output port 116. The serial input ports 110, 114 are configured to receive serial data and the serial output ports 112, 116 are configured to output serial data. Serial data may include command(s) to a device 102, response(s) from a device 102 and/or data associated with the command(s)/response(s). For example, the serial data may include a command that includes a command section and a payload section. The command section may include a command code, a target address and an error check. For example, the command code corresponds to an instruction to be executed by the device 102 whose address corresponds to the target address. The error check may be a packet error check configured to verify that a command has been accurately received. The target address may correspond to an individual device 102, or may correspond to the plurality of devices, e.g., may be a broadcast device address that the plurality of devices are configured to respond to. A command may include other instructions as are evident those skilled in the art. The payload section may include data as described herein.

The vertical bus system 100 may include host controller circuitry, e.g., host management control unit (host MCU) 104. The host MCU 104 may include memory 105, configured to store commands and/or data, as described herein. The host MCU 104 is configured to be coupled to a serial input port and a serial output port of a device 102. For example, in the vertical bus system 100, the host MCU 104 is coupled to the first serial input port 110 and the second serial output port 116 of Device 1. The host MCU 104 is configured to send serial data, e.g., command(s), to the device(s) 102 and may receive serial data, e.g., response(s), from the device(s) 102 using the serial data input ports 110, 114 and serial data output ports 112, 116.

Each device 102 is configured to be coupled to at least one other device 102, using the serial input ports 110, 114 and the serial output ports 112, 116. For example, the first serial output port 112 of Device 1 is coupled to the first serial input port 110 of Device 2 and the second serial output port 116 of Device 2 is coupled to the second serial input port 114 of Device 1. This coupling may be repeated for each pair of devices 102 for the N devices in the vertical bus system 100. In some embodiments, the first serial output port 112 and the second serial input port 114 of Device N may not be connected.

Each device 102 may include a bus controller 106. The bus controller 106 is configured to be coupled to the serial input ports 110, 114 and the serial output ports 112, 116. The bus controller 106 is configured to receive commands from the host MCU 104 and to control the device's 102 response to the command. In other words, the bus controller 106 is configured to receive serial data, including command(s), from the host MCU 104, to interpret, i.e., decode, the received command(s), and to control the device 102, based on the received and interpreted command(s).

Each device 102 may include at least one level shifter 108a, 108b. The level shifters 108a, 108b are configured to shift voltage levels between devices 102 for the non-common ground system 100. For example, a first level shifter 108a may be coupled to the first output port 112 and a second level shifter 108b may be coupled to the second input port 114 of a device 102. The level shifters 108a, 108b are configured to protect the devices 102 from damage due to unequal potentials in coupled devices, e.g., Device 1 and Device 2. Each level shifter 108a, 108b is configured to shift a voltage level of a first device (e.g., Device 1) relative to second (e.g., Device 2) device when the first device is coupled to the second device.

Each device 102 may further include at least one shift register and at least one multiplexer. For example, each device 102 of the vertical bus system 100 includes a first shift register 120, a first multiplexer 122, a second shift register 124 and a second multiplexer 126. Each device 102 may further include a switch 128. The first shift register 120 is coupled to the first serial input port 110 and is configured to be selectively coupled to the first serial output port 112. For example, the bus controller 106 is configured to control the first multiplexer 122 to selectively couple the first shift register 120 or the first serial input port 110 to the first output port 112. The bus controller 106 may control the first multiplexer 122 based on a command from the host MCU 104, as described herein. If the first serial input port 110 in a first device, e.g., Device 1, is coupled to the first serial output port 112 of the first device (e.g., Device 1), then serial data from the host MCU 104 may be provided to a first serial input port of a second device, e.g., first serial input port 110 of Device 2, coupled to the first serial output port 112 of the first device, e.g., Device 1. If the first shift register 120 in a first device, e.g., Device 1, is coupled to the first serial output port 112, then serial data from the first shift register 120 of the first device may be provided to a first serial input port of a second device, e.g., first serial input port 110 of Device 2, coupled to the first serial output port 112 of the first device, e.g., Device 1.

The second shift register 124 is coupled to the second serial input port 114. The second shift register 124 is configured to be selectively coupled to the second serial output port 114. For example, the bus controller 106 is configured to control the second multiplexer 126 to selectively couple the second shift register 124 or the second serial input port 114 to the second output port 116. The bus controller 106 may control the second multiplexer 126 based on a command from the host MCU 104, as described herein.

The switch 128 is configured to controllably couple the first serial input port 110 to an input of the second multiplexer 126. The second multiplexer 126 may then selectively couple the first serial input port 110 to the second serial output port 116. The bus controller 106 is configured to control the state of the switch 128 and the second multiplexer 126. The switch 128 may then be used to test connections between a plurality of devices 102, as will be evident to one skilled in the art.

The vertical bus system 100 is configured to be coupled to a battery pack 130. The battery pack 130 may include a plurality of battery cells. For example, a battery pack 130 may include Lithium-Ion, NiMH (Nickel-Metal Hydride), Lead Acid, Fuel Cell, Super Capacitor, or some other energy storage technology. A subset of the plurality of battery cells may be coupled to each of the plurality of devices 102. The devices 102 are configured to detect parameter(s) associated with the subset(s) of battery cells. The parameter(s) may include local and/or battery cell temperature(s) and/or battery cell voltage(s) and/or current(s), as will be evident to one skilled in the art. The device(s) 102 are configured to provide the parameter(s) to the host MCU 104. For example, the parameter(s) may be included in serial data provided to the host MCU 104 via the second serial output port 116.

Accordingly, the vertical bus system 100 is configured to provide serial data communications between a host MCU and a plurality of devices 102. Advantageously, serial communication may reduce a number of ports for each device. Fewer ports may reduce manufacturing costs, e.g., may reduce a number of pins for a device 102 implemented in an integrated circuit.

Figure 2A:
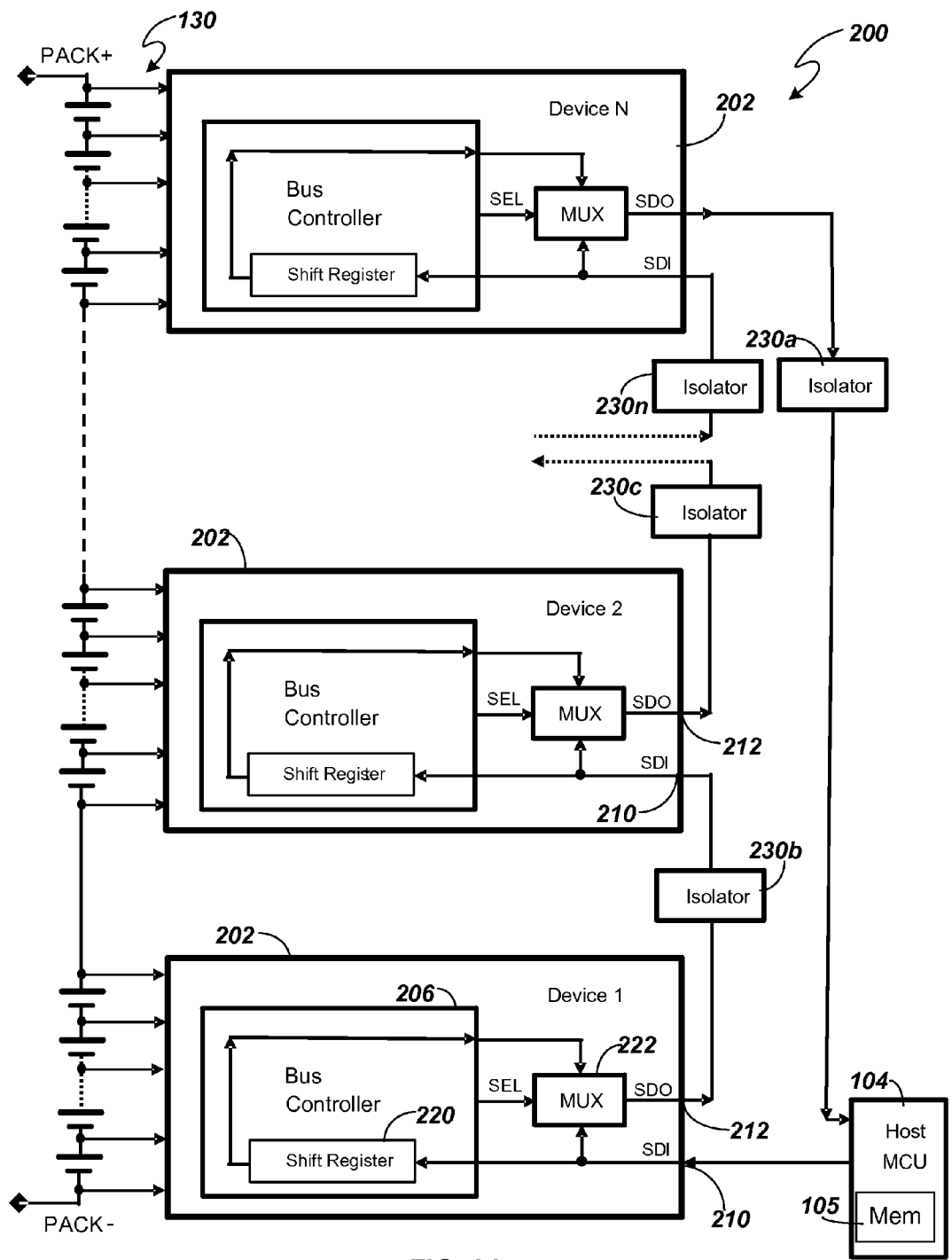
FIG. 2A depicts a block diagram of one embodiment of daisy chain system circuitry consistent with the present disclosure.
Figure 2B:
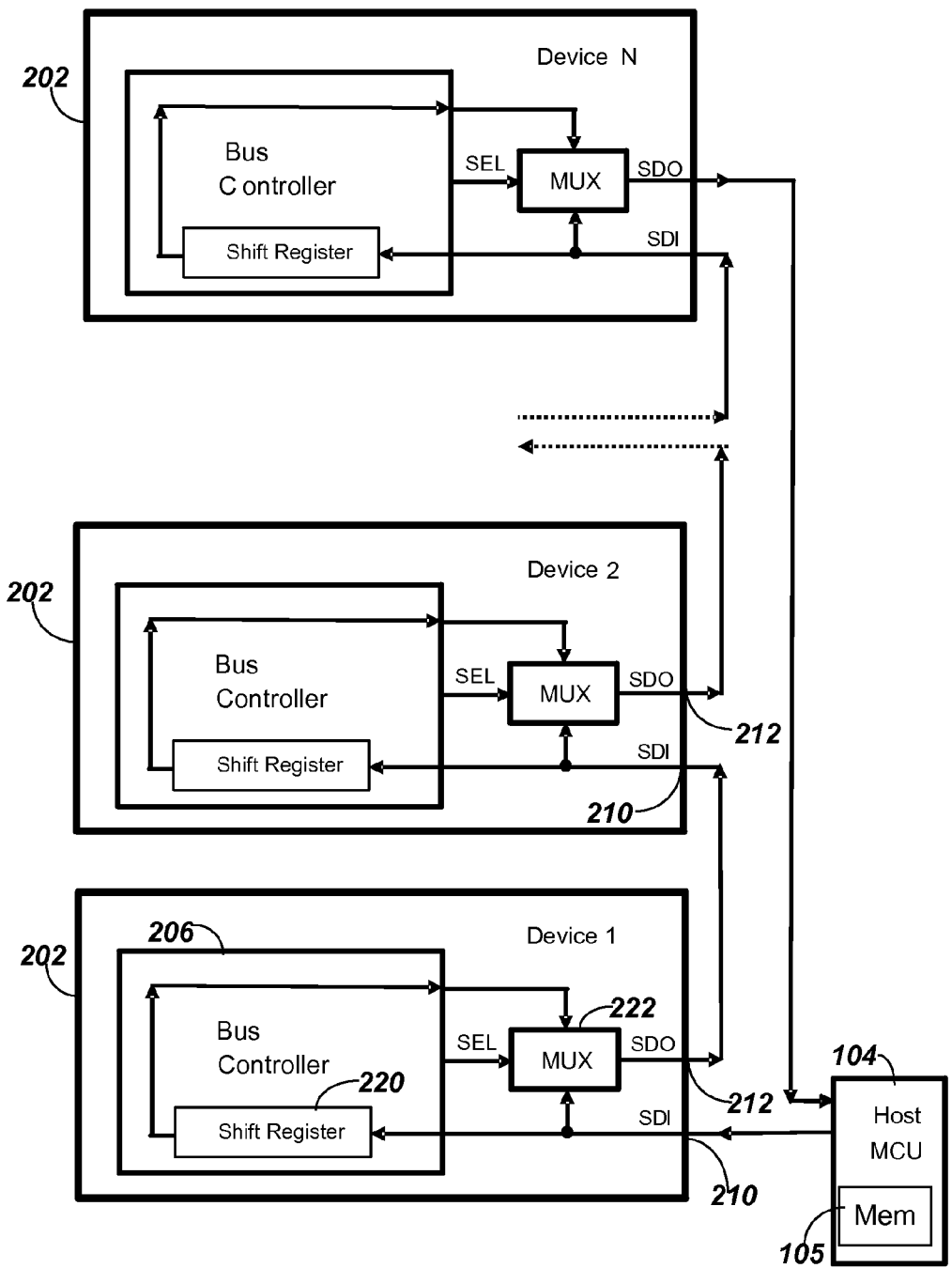
FIG. 2B depicts a block diagram of another embodiment of daisy chain system circuitry 250 consistent with the present disclosure.

FIG. 2A depicts a block diagram of one embodiment of daisy chain system circuitry 200 consistent with the present disclosure. FIG. 2B depicts a block diagram of another embodiment of daisy chain system circuitry 250 consistent with the present disclosure. In the embodiments 200, 250, common elements have common reference designators. Both embodiments of system circuitry 200, 250 are configured as a daisy chain as described herein. The daisy chain system 200 of FIG. 2A is configured with a non-common ground and the daisy chain system 250 of FIG. 2B is configured with a common ground, as will be evident to one skilled in the art.

The daisy chain systems 200, 250 may each include a plurality of devices 202. Each device 202 includes device circuitry. For example, each daisy chain system 200, 250 may include a plurality of devices: Device 1, Device 2, ..., Device N. Each device 202 may include a serial input port 210 configured to receive serial data and a serial output port 212 configured to provide serial data. Serial data may include command(s) to a device 202, response(s) from a device 202 and/or data associated with the command(s)/response(s). For example, the serial data may include a command that includes a command section and a payload section, as described herein.

The daisy chain systems 200, 250 may include the host MCU 104. Each device 202 is configured to be coupled to at least one other device 202. At least one device 202 is configured to be coupled to the host MCU 104. The serial input port 210 of a first device is configured to be coupled to the host MCU 104 or the serial output port 212 of a second device 202. The serial output port 212 of the first device is configured to be coupled to the serial input port 210 of a third device 202 or to the host MCU 104. For example, in the daisy chain systems 200, 250, the serial input port 210 of Device 1 is coupled to the host MCU 104 and the serial output port 212 of Device 1 is coupled to the serial input port 210 of Device 2. Continuing with this example, the serial output port 212 of Device N is coupled to the host MCU 104.

The daisy chain system 200 of FIG. 2A further includes a plurality of isolators 230a, 230b, 230c, ..., 230n. The isolators 230a, 230b, 230c, ..., 230n are configured to be coupled between the devices 202 and the Nth device and the host MCU 104. An isolator is coupled to the first serial output port of each device 202 and a first serial output port of another device 202 or the host MCU 104. Similar to the level shifters of FIG. 1, the isolators 230a, 230b, 230c, ..., 230n are configured to accommodate unequal potentials in the devices 202 when they are coupled in a daisy chain system without a common ground, as will be evident to one skilled in the art.

The daisy chain systems 200, 250 are configured to be coupled to a battery pack 130. The battery pack 130 may include a plurality of battery cells. A subset of the plurality of battery cells may be coupled to each of the plurality of devices 202. The devices 202 are configured to detect parameter(s) associated with the subset(s) of battery cells, as described herein. The device(s) 202 are configured to provide the parameter(s) to the host MCU 104. For example, the parameter(s) may be included in serial data provided to the host MCU 104 via the serial output port 212.

Each device 202 may include a bus controller 206, a shift register 220 and a multiplexer 222. The bus controller 206 is coupled to the serial input port 210. The shift register 220 is configured to be coupled to the serial input port 210. The multiplexer 222 is configured to selectively couple the serial output port 212 to the shift register 220 or the serial input port 210. The bus controller 206 is configured to control the multiplexer 222 to couple the shift register 220 or the serial input port 210 to the serial output port 212, based at least in part, on a command from, e.g., the host MCU 104.

FIG. 3A depicts a data structure 300 corresponding to command(s) to assign addresses to a plurality of devices in a system, e.g., system 100, 200 and/or 250. FIG. 3B depicts a data structure 350 corresponding to command(s) to change the address of a single device in the system, e.g., system 100, 200 and/or 250. Each command 300, 350 includes a plurality of fields. For example, each field may include eight bits. Each command 300, 350 includes a command section 310a, 310b and a payload section 320a, 320b. Each command section 310a, 310b includes a plurality of fields: a command code 312a, 312b, a target address 314a, 314b and an error check, packet error check (PEC) 316a, 316b. The command code 312a, 312b is configured to include instruction(s) to a device and may be interpreted by a bus controller. In one example, the target address, e.g., target address 314a, may be a broadcast address, targeted to a plurality of devices in the system. In another example, the target address, e.g., target address 314b, may be targeted to an individual device, i.e., the target address may be an individual device address. The PEC 316a, 316b, is configured to provide error checking to determine whether a command section 310a, 310b has been accurately received.

The command 300 is configured to assign new addresses to a plurality of devices coupled in a system. For example, the devices may be manufactured with a default address that may not be unique between devices. The payload section 320a is configured to include the new addresses 322a, ..., 322n and error checks 324a, ..., 324n for the plurality of devices in the system. Each address may have an associated PEC 324a, ..., 324n. The address 322a and PEC 324a for Device N may be "first" and the address 322n and PEC 324n for Device 1 may be "last". In other words, when a command, e.g., command 300, is sent serially, the command section 310a is received first followed by the payload section 320a. In the payload section 320a, the Nth device address 322a is received first, followed by the Nth device PEC 324a, followed by the N−1 device address, followed by the N−1 device PEC, and so on, until the first device address 322n and then the first device PEC 324n are received. The order of the addresses 322a, ..., 322n corresponds to the systems 100, 200, 250, with the host MCU 104 coupled to Device 1. Other orders for the payload section 320a and a corresponding system are possible and remain within the scope of the present disclosure. The command 350 is configured to assign (i.e., change) a new address to a device with an "old" address, as is evident to one skilled in the art.

The command 300 may be used with systems 100, 200, 250 to initially assign addresses to a plurality of devices in each system. The command 350 may be used with systems 100, 200, 250 to change the address(es) of one or more device(s) in the system. In this manner, address(es) may be assigned to device(s) after the devices have been assembled into a system.

Figure 4A:
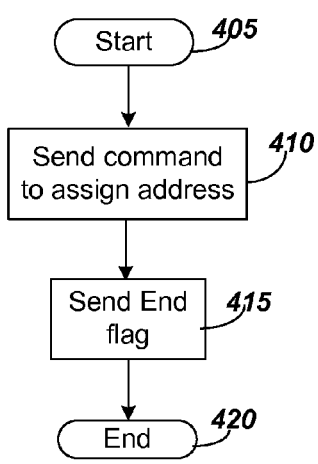
FIG. 4A depicts a flowchart of exemplary operations for a assigning addresses to a plurality of devices consistent with the present disclosure.
Figure 4B:
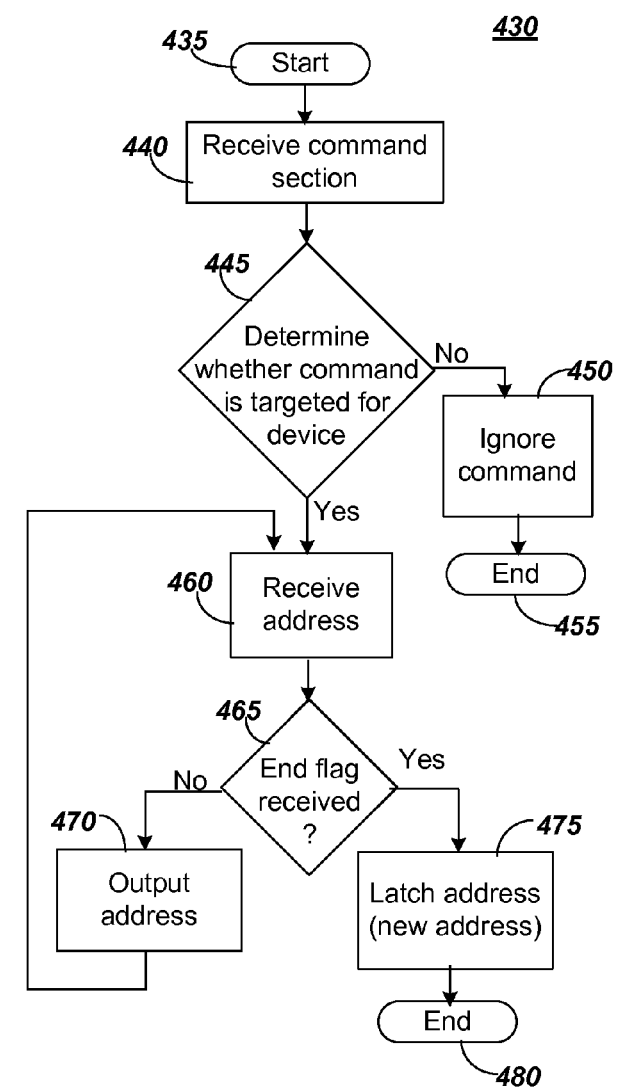
FIG. 4B depicts another flowchart of exemplary operations for a assigning addresses to a plurality of devices consistent with the present disclosure.

FIG. 4A depicts a flow chart 400 of operations that may be performed by, e.g., a host MCU 104, to initially assign addresses to a plurality of devices and/or to change the address of an individual device. FIG. 4B depicts a flow chart 430 of operations that may be performed by, e.g., the device(s), in the systems 100, 200, 250. It is assumed that a plurality of devices has been coupled into a system, e.g., system 100, 200 or 250, prior to beginning the operations depicted in the flow charts 400, 430.

Referring first to FIG. 4A, program flow may begin at start 405. At operation 410, a command may be sent to assign one or more addresses. The command may be sent from the host MCU 104 to a device coupled to the host MCU, e.g., Device 1. For example, command 300 may be sent including a command code 312a configured to assign a plurality of addresses and including an address corresponding to all devices, i.e., broadcast address. In this example, it is assumed that the host MCU "knows" a number N, of devices in the system. Continuing with this example, the payload section 320a includes an address and an error check for each device in the N devices in the system. In another example, command 350 may be sent including a command code 312b configured to change the address of the device with an "old" address to a new address. The new address is included in the payload section 320b of command 350. Continuing with this example, the "old" address corresponds to the device address 314b in the command section. When the command 300, 350 has been sent, an end flag may be sent at operation 415. The end flag is configured to communicate to the bus controllers that the command is complete, as described herein. Program flow may end at operation 420.

Referring now to FIG. 4B, program flow may begin at start 435. At operation 440, a device may receive a command section, e.g., 310a or 310b, of a command, e.g., command 300 or command 350. At operation 445, whether the command is targeted for the device may be determined. For example, a bus controller may interpret the command section and the address field to determine whether the bus controller's associated device is the targeted device for the command. If the bus controller's associated device is not the targeted device, the bus controller may ignore the command, at operation 450, and program flow may then end at operation 455.

If the bus controller's associated device is the targeted device, the bus controller may receive an address at operation 460. For example, the bus controller's associated device may be the targeted device if the command is a broadcast command, e.g., command 300. In another example, the bus controller's associated device may be the targeted device if the "old" address of command 350 corresponds to the address of the bus controller's associated device. If the command is a broadcast command and the command code corresponds to assign addresses, the bus controller is configured to control the associated device components, e.g., multiplexer and/or shift register, as described herein. At operation 460, the bus controller may buffer the received address, e.g., in its first shift register, and may perform error checking based on the PEC associated with the received address.

At operation 465, whether an end flag has been received may be determined. If an end flag has not been received, at operation 470, the device may output the address received at operation 460. Program flow may proceed to operation 460 to receive another address. If an end flag has been received, at operation 475, the address may be "latched", corresponding to a new address for the device. Program flow may end at operation 450.

For example, referring to FIG. 1 and FIG. 4B, assigning addresses to a plurality of devices may proceed as follows. Initially, the first multiplexer 122 in the plurality of devices 102 may be configured to couple the first serial input port 110 to the first serial output port 112. The host MCU 104 may send the command section 310a corresponding to assigning a plurality of addresses. Each bus controller 106 may receive and interpret the command section 310a. As a result, each bus controller 106 may be configured to control the first multiplexer 122 to couple the first shift register 120 to the first output port 112. As a result, the first shift register 120 of Device 1 is configured to receive serial data from the host MCU 104. The host MCU 104 may then begin to send the payload section 320a, i.e., may send at least a portion of payload section 320a. Device 1 may then receive the Nth device address, i.e., the address for Device N, and the PEC for the Nth device address. The Nth device address may be provided to the first shift register 120 of Device 1. The host MCU 104 may continue to send the payload section 320a, i.e., may send the N−1 Device address and the PEC for the (N−1) device. Device 1 may then begin to receive the (N−1) device address and may provide the Nth device address to Device 2 (i.e., no end flag received).

For example, the first shift register 120 of Device 1 may be configured to provide the Nth device address, i.e., serial data, to the first multiplexer 122 and first output port 112 of Device 1. The first input port 110 of Device 2 is coupled to the first output port 112 of Device 1. The first shift register 120 of Device 2 may then receive the Nth device address. This process may continue until the first shift register 120 of Device N contains the Nth device address and/or an end flag is received. The first shift register 120 of Device 1 may then contain the first device address and the first shift registers 120 of the intervening devices may contain their corresponding addresses. An end flag may then be sent to the devices 102 and each device may then latch the address that is in each device's first shift register 120 as the device's new address.

In another example, referring to FIG. 2A and/or FIG. 2B and FIG. 4B, assigning addresses to a plurality of devices may proceed as follows. Initially, the multiplexer 222 in the plurality of devices 202 may be configured to couple the serial input port 210 to the serial output port 212. The serial input port 210 is coupled to the bus controller 206 of device 202. The host MCU 104 may send the command section 310a corresponding to assigning a plurality of addresses. Each bus controller 206 may receive and interpret the command section 310a. As a result, each bus controller 206 may be configured to control the multiplexer 222 to couple the shift register 220 to the serial output port 212. As a result, the shift register 220 of Device 1 is configured to receive serial data from the host MCU 104. The host MCU 104 may then begin to send the payload section 320a. Device 1 may then receive the Nth device address, i.e., the address for Device N, and the PEC for the Nth device address. The Nth device address may be provided to the shift register 220 of Device 1. The host MCU 104 may continue to send the payload section 320a, i.e., may send the N−1 Device address and the PEC for the (N−1) device. Device 1 may then begin to receive the (N−1) device address and may provide the Nth device address to Device 2 (i.e., no end flag received). For example, the shift register 220 of Device 1 may be configured to provide the Nth device address, i.e., serial data, to the multiplexer 222 and output port 212 of Device 1. The serial input port 210 of Device 2 is coupled to the serial output port 212 of Device 1. The serial shift register 220 of Device 2 may then receive the Nth device address. This process may continue until the shift register 220 of Device N contains the Nth device address. The shift register 220 of Device 1 may then contain the first device address and the shift registers 220 of the intervening devices may contain their corresponding addresses. An end flag may then be sent to the devices 202 and each device 202 may then latch the address that is in the device's corresponding shift register 220 as the device's new address.

Accordingly, based on the command structure 300, and the configuration of the systems 100, 200, 250 of devices, new, unique addresses may be assigned to a plurality of devices, after the devices have been assembled into a system. The bus controller in each device is configured to receive and interpret commands from the host MCU and to selectively couple a serial output port to a serial input port or a shift register. The shift register is configured to receive at least an address and may output the address, based on a command from the host MCU.

Advantageously, common devices may be manufactured without setting individual address(es) at the time of manufacturing facilitating a lower cost and relatively faster manufacturing process. A plurality of generally identical devices may be assembled together in a generally random order. Addresses may then be assigned to the plurality of devices, providing a cost savings based on volume production of generally identical devices. The addresses may be assigned serially, reducing a number of ports for each device, providing further cost savings for devices implemented in, e.g., integrated circuitry.

Of course, while FIGS. 4A and 4B depict exemplary operations according to some embodiments, it is to be understood that in other embodiments all of the operations depicted in FIG. 4A and/or FIG. 4B may not be necessary. Indeed, it is fully contemplated herein that other embodiments of the present disclosure may include sub-combinations of the operations depicted in FIG. 4A and/or FIG. 4B and/or additional operations. Thus, claims directed to features and/or operations that are not exactly shown in one drawing are deemed within the scope and content of the present disclosure.

Memory 105 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 105 may comprise other and/or later-developed types of computer-readable memory.

Embodiments of the methods described herein may be implemented using a processor and/or other programmable device. To that end, the methods described herein may be implemented on a tangible computer readable medium having instructions stored thereon that when executed by one or more processors perform the methods. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

Unless specifically stated otherwise, as apparent from the preceding discussions, it is appreciated that throughout the specification discussions utilizing terms such as "operations," "processing," "computing," "calculating," "determining," or the like, refer to the action and/or processes of a computer or computing system, or similar electronic computing device or apparatus, that manipulate and/or transform data represented as physical, such as electronic, quantities within the computing system's registers and/or memories into other data similarly represented as physical quantities within the computing system's memories, registers or other such information storage, transmission or display devices.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus, comprising:
a first device comprising:
a first serial input port configured to receive serial data from at least one of a host MCU and a second device;
a first serial output port configured to output the serial data to a third device when the third device is coupled to the first device;
a first shift register configured to receive the serial data from the first serial input port;
a first multiplexer configured to selectively couple the first serial output port to the first shift register or the first serial input port; and
a bus controller configured to receive the serial data from the first serial input port, the bus controller further configured to control the first multiplexer to couple the first serial output port to the first serial input port or the first shift register, based at least in part on the serial data,
wherein the serial data comprises a command section of a command and at least a portion of a payload section of the command, wherein the command section comprises a command code, a target address and an error check and the payload section comprises at least one new address and at least one corresponding error check.

2. The first device of claim 1, further comprising:
a second serial input port configured to receive serial data from the third device when the third device is coupled to the first device;
a second serial output port configured to output the serial data to at least one of the second device and the host MCU;
a second shift register configured to receive the serial data from the second serial input port; and
a second multiplexer configured to selectively couple the second serial data output port to the second shift register or the second serial data input port;
wherein the bus controller is further configured to receive the serial data from the second serial input port, the bus controller further configured to control the second multiplexer to selectively couple the second serial output port to the second serial input port, based at least in part on the serial data.

3. The first device of claim 2, further comprising a switch, wherein the switch is configured to couple the first serial input port to the second multiplexer when the switch is closed to provide a test circuit, wherein the bus controller is configured to control the switch.

4. The apparatus of claim 1, wherein the target address a broadcast address and the payload section comprises a plurality of new addresses and the plurality of corresponding error checks.

5. The apparatus of claim 1, wherein the target address is an old address and the payload section comprises one new address and one corresponding error check.

6. The apparatus of claim 1, wherein the first device further comprises a level shifter configured to shift a voltage level of the first device relative to another device when the another device is coupled to the first device.

7. A method for assigning an address to at least one device, the method comprising:
receiving serial data at a first device, wherein the serial data comprises a command section of a command and at least a portion of a payload section of the command, wherein the command section comprises a command code, a target address and a command error check and the payload section comprises at least one new address and at least one corresponding error check;

determining whether the serial data is targeted for the first device based, at least in part, on the command section;

storing a first address in the first device if the serial data is targeted for the first device; and outputting the first address to a second device or latching the first address in the first device based, at least in part, on the command section.

8. The method of claim 7, wherein the payload comprises a plurality of new addresses, the method further comprising receiving the first address at the second device, receiving a second address at the first device, storing the first address in the second device and storing the second address in the first device, determining whether the serial data comprises an end flag, and outputting the first address to a third device and the second address to the second device or latching the first address in the second device and the second address in the first device, based, at least in part, on whether the serial data comprises the end flag.

9. The method of claim 7, wherein each device comprises a shift register configured to receive the at least one new address.

10. The method of claim 9, wherein the shift register of the first device is further configured to output the first address to the second device.

11. A system, comprising:
a plurality of devices; and
a host controller coupled to a first device of the plurality of devices, the host controller is configured to provide serial data to the first device wherein the serial data comprises a command section of a command and at least a portion of a payload section of the command, the command section comprises a command code, a target address and an error check and the payload section comprises at least one new address and at least one corresponding error check, wherein the command code is configured to cause at least one device to store or output a respective new address;
wherein each device comprises:
a first serial input port configured to receive the serial data,
a first serial output port configured to output the serial data to another device,
a first shift register configured to receive the serial data from the first serial input port,
a first multiplexer configured to selectively couple the first serial output port to the first shift register or the first serial input port, and
a bus controller configured to receive the serial data from the first serial input port, the bus controller further configured to control the first multiplexer to couple the first serial output port to the first serial input port or the first shift, based at least in part on the serial data.

12. The system of claim 11, wherein each device further comprises:
a second serial input port configured to receive the serial data;
a second serial output port configured to output the serial data;
a second shift register configured to receive the serial data from the second serial input port; and
a second multiplexer configured to selectively couple the second serial data output port to the second shift register or the second serial data input port;
wherein the bus controller is further configured to receive the serial data from the second serial input port, the bus controller further configured to control the second multiplexer to selectively couple the second serial output port to the second serial input port, based at least in part on the serial data.

13. The system of claim 12, wherein each device further comprises a switch, wherein the switch is configured to couple the first serial input port to the second multiplexer when the switch is closed to provide a test circuit, wherein the bus controller is configured to control the switch.

14. The system of claim 11, wherein the target address a broadcast address and the payload section comprises a plurality of new addresses and the plurality of corresponding error checks.

15. The system of claim 11, wherein the target address is an old address and the payload section comprises one new address and one corresponding error check.

16. The system of claim 11, wherein each device further comprises a level shifter configured to shift a voltage level of the first device relative to another device when the another device is coupled to the first device.

17. The system of claim 11, wherein the host controller is further coupled to a second device of the plurality of devices.

18. The system of claim 11, wherein the plurality of devices and host controller are coupled in a daisy chain with a common ground, wherein the first serial output port of each device is coupled to a first serial output port of another device or the host controller.

19. The system of claim 11, the system further comprising a plurality of isolators, wherein the plurality of devices and the host controller are coupled in a daisy chain with a non-common ground and a respective isolator is coupled to the first serial output port of each device and a first serial output port of another device or the host controller.

20. The system of claim 12, wherein the plurality of devices and host controller are coupled in a vertical bus with a non-common ground, wherein the first serial input port and the second serial output port of the first device are coupled to the host controller, the first serial output port of the first device is coupled to the first serial input port of another device and the second serial input port of the first device is coupled to the second serial output port of the another device.

* * * * *